Sept. 8, 1959  J. K. BYROM  2,902,842
FLEXIBLE COUPLINGS
Filed Jan. 27, 1958  3 Sheets-Sheet 3
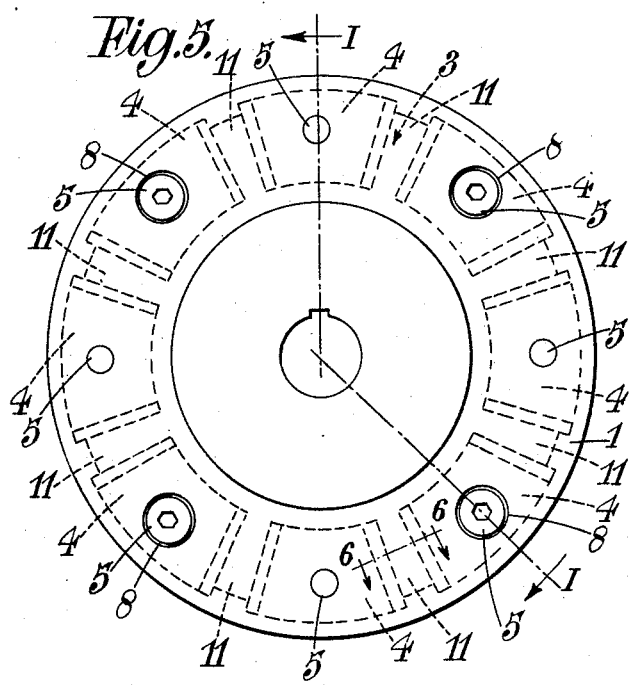
*Fig.5.*
*Fig.6.*
INVENTOR
JOHN K. BYROM
BY Mawhinney & Mawhinney 2,902,842
Patented Sept. 8, 1959

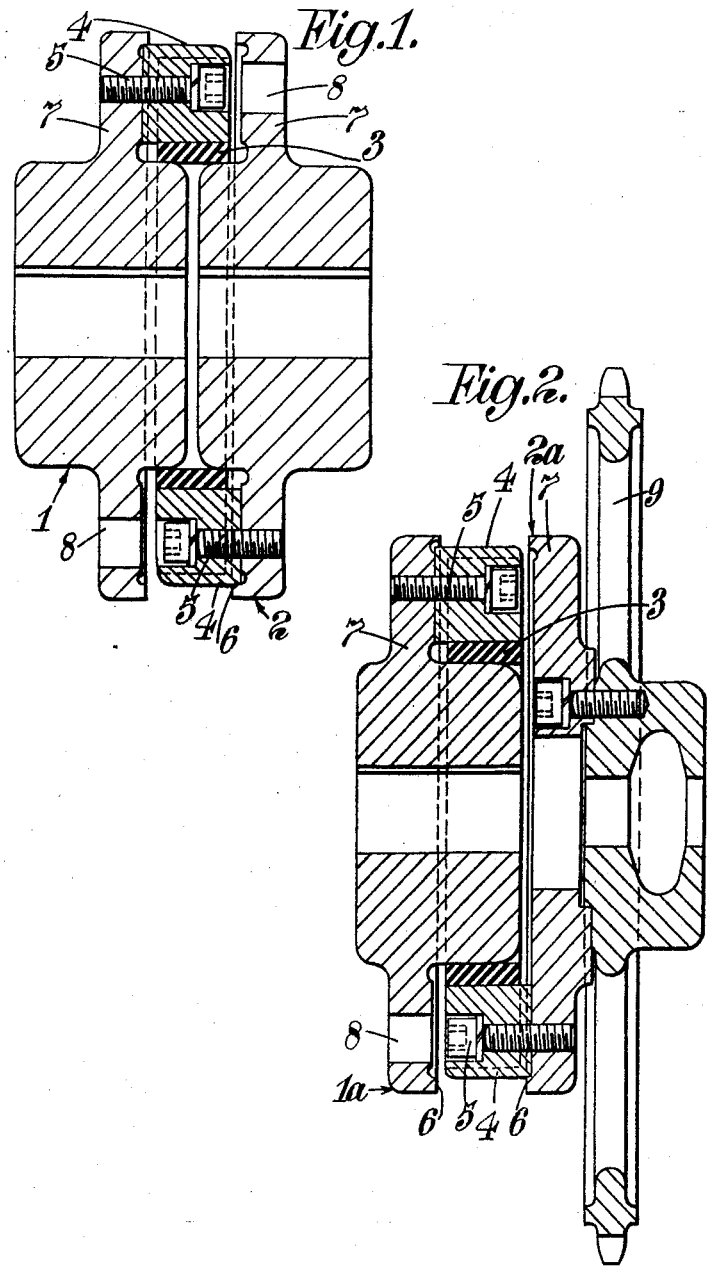

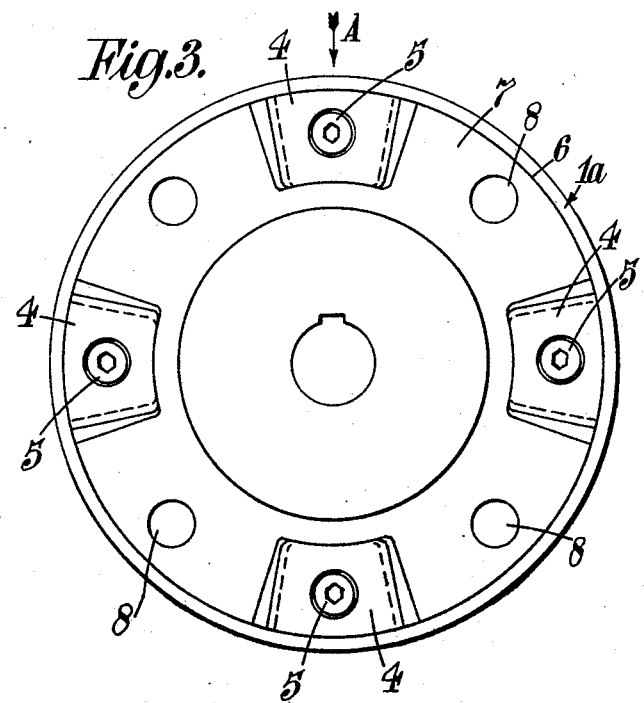
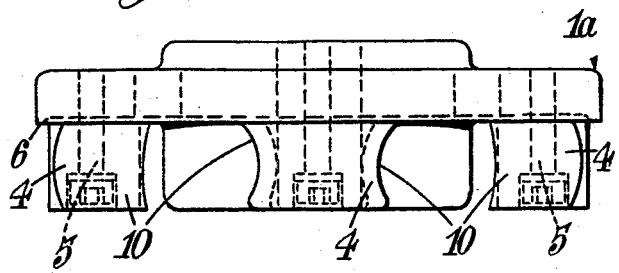

2,902,842
FLEXIBLE COUPLINGS

John Knights Byrom, Wythenshawe, Manchester, England, assignor to Renold Chains Limited, Manchester, England, a British company Application January 27, 1958, Serial No. 711,351

Claims priority, application Great Britain January 28, 1957

7 Claims. (Cl. 64—14)

The invention relates to flexible couplings and is more particularly concerned with such couplings of the kind (hereinafter referred to as the kind described) comprising two members attached, or for attachment, respectively to two shafts or other parts to be coupled, and a flexible or resiliently deformable member between the said two members and providing a coupling therebetween, which said two members have dogs or projections which interengage with the said flexible member. An example of a flexible coupling of the kind described is described and shown in our British patent specification No. 486,803.

The invention provides a flexible coupling of the kind described, in which one or some or all of the dogs is, or are, detachable from the said two members and the arrangement is such that in assembling the coupling, one or some or all of the dogs can be moved into and secured in position after the said two members and the said flexible member have been assembled together.

The invention also provides a flexible coupling of the kind described, in which at least one of the dogs is formed separately from the said two members and in which means are provided for securing the or each separately formed dog to one of the said two members after it has been assembled with the flexible member.

The, or each, detachable or separately formed dog is preferably secured to one of the said members by means of a screw or screws, and one or more clearance or access holes is, or are, preferably provided to permit the screw or screws to be inserted after the said two members and the flexible member have been assembled together.

The invention also provides a method of manufacturing a flexible coupling of the kind described, which method comprises forming at least one of the dogs separately from the said two members, assembling the said two members with the dogs and the flexible member, and then securing the, or each, separately formed dog to one of the said two members.

A preferred specific construction of a flexible coupling, and a modification thereof, both embodying the invention will now be described by way of example, and with reference to the accompanying drawings, in which:

Figure 1 is a sectional view of the coupling on the line I—I of Fig. 5.

Figure 2 is a view similar to Figure 1 but showing the modified construction,

Figure 3 shows one of the outer or flanged members of Figure 2 with the detachable dogs secured thereto, Figure 4 is another view of the flanged member of Figure 3, as seen in the direction of the arrow A, Figure 5 is an end view of the assembled coupling of Figure 1, and Figure 6 is a cross sectional view of one of the arms of the flexible member, taken on the line 6—6 of Figure 5 and showing the barrel-shaped cross section of the arms.

In the example of Figures 1 and 5 the outer members are provided as two circular flanged members 1, 2. Detachable dogs 4 are secured to the flanges 7 of the members 1, 2, in equally spaced positions, by means of socket-headed screws 5. The number of dogs 4 is equal to the number of spaces between the radial arms 11 of the flexible member 3, which is of rubber or like material. Alternate spaces between those arms are occupied by the dogs secured to the member 1 and the remainder of those spaces are occupied by the dogs secured to the member 2.

The flanged members 1 and 2 are each provided with a lip 6 on the periphery of the faces to which the dogs 4 are secured, for locating the dogs in position. Clearance holes 8 for the socket screws 5 to pass through are provided in each of the flanged members 1, 2 at positions opposite to the screw heads in the other flanged members 2, 1.

In the modified construction shown in Figure 2 the clearance holes 8 are omitted from the flanged member 2a as that flanged member carries a chain wheel 9 which would obstruct such clearance holes if they were provided in the member 2a. Clearance holes 8 are provided in the other flanged member 1a.

The concave shape of the edges of the dogs and the corresponding barrel-shape of the arms of the resiliently deformable member provide a flexible coupling which has been found by the applicant to be exceptionally satisfactory in operation and to be particularly resistant to wear. For instance, the specified shapes of the dogs the arms of the resiliently deformable member enable the flexible coupling to be employed for coupling together two shafts which are slightly out of alignment. The lack of alignment merely causes the arms of the resiliently deformable member to twist slightly without sliding across the adjacent faces of the dogs, and undue wear of the resiliently deformable member is thereby avoided.

It will be seen that by employing the construction of these examples some or all of the dogs can be slid into and secured in position after the flanged members and flexible member have been positioned on shafts to be coupled, thus obviating any need for forcing the barrel shaped radial arms 11 of the flexible member 3 over the concave profiles 10 of the dogs. In the case of the modified construction (Figure 2), the dogs of the flanged member 1a are secured thereto before the coupling is positioned on the shafts and the remaining dogs are slid into position and secured to the flanged member 2a after assembly of the rest of the coupling.

The invention is not restricted to the details of the foregoing examples. For instance, the flanged member 2a may carry a gear, pulley or other device instead of a chain wheel. The socket-headed screws may be replaced by any convenient alternative fastening means. A different number of dogs, with a corresponding different number of spaces between the arms of the flexible members, may be provided.

I claim:

1. A flexible coupling comprising two members for attachment respectively to two parts to be coupled, a resiliently deformable member between the said two members, which resiliently deformable member comprises radially extending arms and which said two members have dogs which engage between the said arms, the said dogs having concave edges adjacent the said arms, the said arms being barrel-shaped in cross-section to fit the concave edges of the dogs, at least one of the said dogs being formed separately from the said two members, and means detachably securing the separately formed dog to one of the said two members, whereby the separately formed dog may be secured to the said one of the two members after it has been assembled with the resiliently deformable member.

2. A flexible coupling comprising two members for attachment respectively to two parts to be coupled, a resiliently deformable member between the said two members, which resiliently deformable member comprises radially extending arms and which said two members have dogs which engage between the said arms, the said dogs having concave edges adjacent the said arms, the said arms being barrel-shaped in cross-section to fit the concave edges of the dogs, at least some of the said dogs being formed separately from the said two members, means detachably securing the separately formed dogs to at least one of the said two members, whereby the separately formed dogs may be secured to the said member after it has been assembled with the resiliently deformable member, and at least one locating projection on at least one of the said two members, which projection co-operates with the separately formed dogs to locate them in position.

3. A flexible coupling comprising two circular members for attachment respectively to two parts to be coupled, a resiliently deformable member between the said two members, which resiliently deformable member comprises radially extending arms and which said two members have dogs which engage between the said arms, the said dogs having concave edges adjacent the said arms, the said arms being barrel-shaped in cross-section to fit the concave edges of the dogs, at least some of the said dogs being formed separately from the said two members, means detachably securing the separately formed dogs to at least one of the said two circular members, whereby the separately formed dogs may be secured to the said circular member after it has been assembled with the resiliently deformable member, and an upstanding lip around the periphery of the said circular member and co-operating with the separately formed dogs to locate them in position.

4. A flexible coupling comprising two members for attachment respectively to two parts to be coupled, a boss on at least one of the said members, a resiliently deformable member between the said two members, which resiliently deformable member comprises radially extending arms radiating from a central annular portion closely embracing the said boss, dogs on the said two members and engaging between the said arms, the said dogs having concave edges adjacent the said arms, the said arms being barrel-shaped in cross-section to fit the concave edges of the dogs, at least some of the said dogs being formed separately from the said two members and means detachably securing the separately formed dogs to at least one of the said two members, whereby the separately formed dogs may be secured to the said member after it has been assembled with the resiliently deformable member.

5. A flexible coupling according to claim 4, including a wheel carried by one of the said two members and thereby supported from the other of the said two members by means of the resiliently deformable member.

6. A flexible coupling comprising two circular members for attachment respectively to two parts to be coupled, a boss on at least one of the said members, a resiliently deformable member between the said two circular members, which resiliently deformable member comprises radially extending arms radiating from a central annular portion closely embracing the said boss, dogs engaging between the said arms, the said dogs having concave edges adjacent the arms of the flexible member, the arms of the flexible member being barrel-shaped in cross-section to fit the concave edges of the dogs, the said dogs being formed separately from the said two members, means detachably securing the dogs to the said circular members, whereby the dogs may be secured to the said circular members after they have been assembled with the resiliently deformable member, and an upstanding lip around the periphery of each of the said circular members and co-operating with the dogs to locate them in position.

7. A flexible coupling according to claim 6, wherein the said means for securing the dogs to the said circular members comprise headed screws each passing through one of the dogs into engagement with one of the said circular members and having its head recessed in the dog.

References Cited in the file of this patent

UNITED STATES PATENTS

| | | |
|---|---|---|
| 2,122,838 | Guy | July 5, 1938 |
| 2,146,765 | Ricefield | Feb. 14, 1939 |
| 2,157,996 | Brownstein | May 9, 1939 |

FOREIGN PATENTS

| | | |
|---|---|---|
| 503,284 | Great Britain | Apr. 4, 1939 |